Dec. 14, 1937. E. ZAHM 2,102,105
METHOD OF DETERMINING THE GAS CONTENT OF SOLUTIONS
Filed Dec. 17, 1934 2 Sheets-Sheet 1
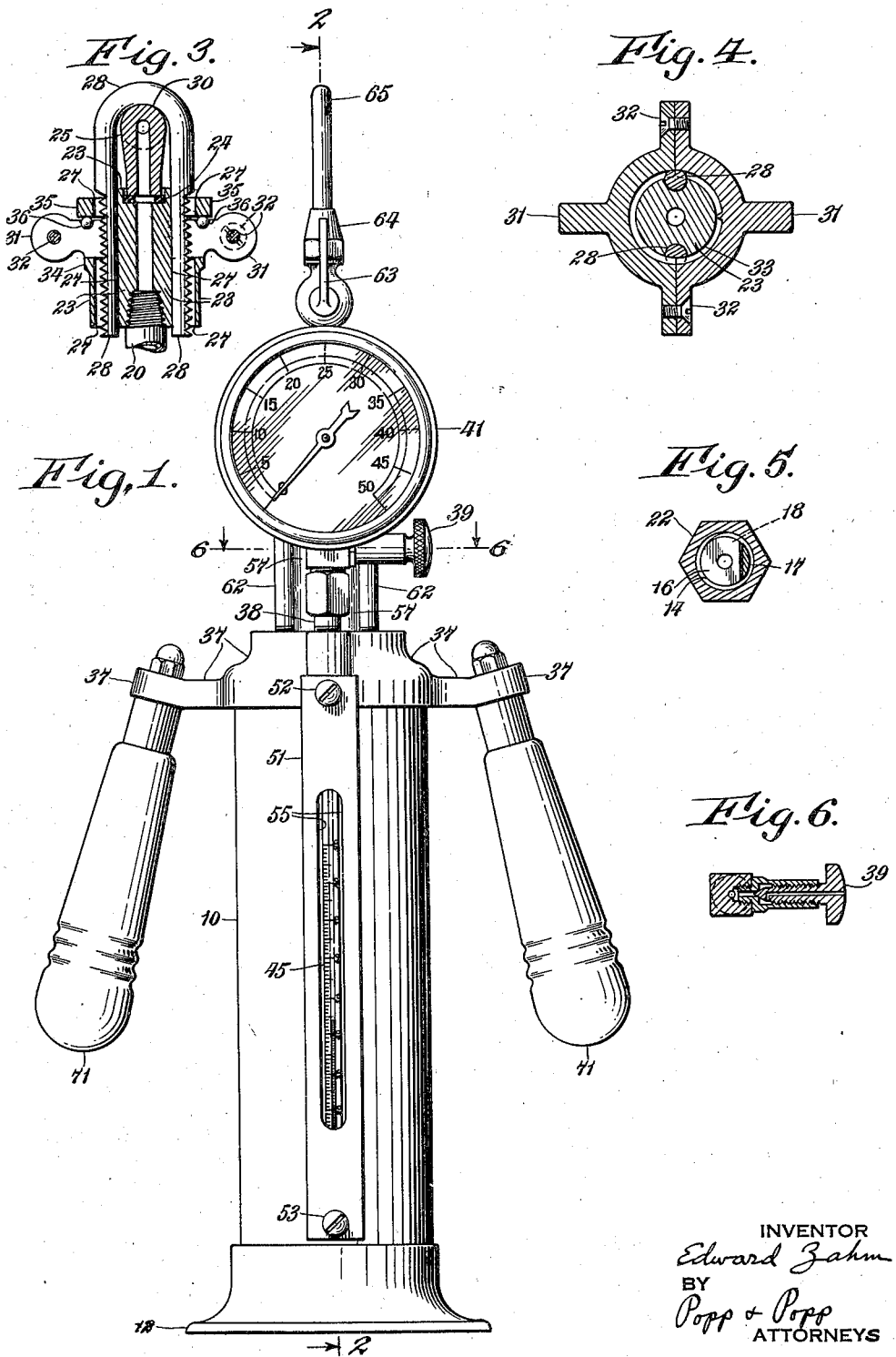
INVENTOR
Edward Zahm
BY
Popp & Popp
ATTORNEYS Dec. 14, 1937.       E. ZAHM       2,102,105
METHOD OF DETERMINING THE GAS CONTENT OF SOLUTIONS
Filed Dec. 17, 1934       2 Sheets-Sheet 2
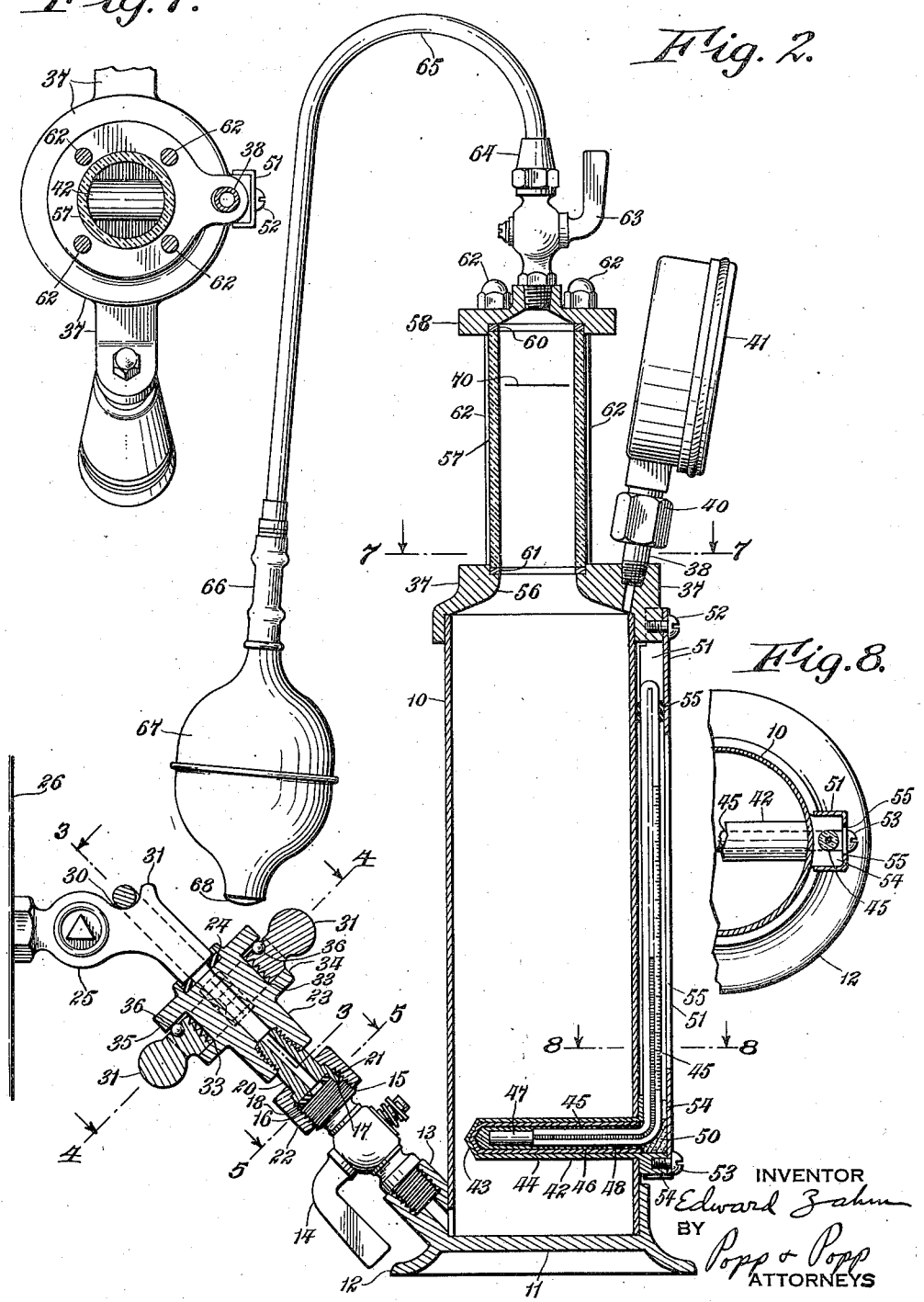
INVENTOR
Edward Zahm
BY
Popp & Popp
ATTORNEYS Patented Dec. 14, 1937

2,102,105

UNITED STATES PATENT OFFICE 2,102,105

METHOD OF DETERMINING THE GAS CONTENT OF SOLUTIONS

Edward Zahm, Buffalo, N. Y., assignor to Zahm & Nagel Co., Inc., Buffalo, N. Y., a corporation of New York Application December 17, 1934, Serial No. 757,915

2 Claims. (Cl. 73—151)

This invention relates to a method of determining the gas content of gas-liquid solutions under pressure, and is more particularly adapted to determine the percentage of $CO_2$ in beer.

The principal object of this invention is to provide a method of this character which will enable the gas content of gas-liquid solutions under pressure to be quickly, conveniently and accurately determined without loss of gas while being transferred into the apparatus. Numerous collateral objects of the invention and practical solutions thereof are disclosed in detail in the herein patent specification, wherein:

Figure 1 is a front elevation of the complete gas testing apparatus.

Figure 2 is a vertical, longitudinal section thereof, taken on line 2—2 Fig. 1.

Figure 3 is an inclined, medial section through the clamping device, taken on line 3—3 Fig. 2.

Figure 4 is an inclined, transverse section through said clamping device, taken on line 4—4 Fig. 2.

Figure 5 is an inclined, transverse section through the coupling of the inlet cock, taken on line 5—5 Fig. 2.

Figure 6 is a horizontal section through the bleeder valve, taken on line 6—6 Fig. 1.

Figure 7 is a horizontal section through the upper part of the apparatus, taken on line 7—7 Fig. 2.

Figure 8 is a horizontal section through the thermometer and associated parts, taken on line 8—8 Fig. 2.

Similar characters of reference indicate like parts in the several figures of the drawings.

It has been found highly desirable in breweries to accurately test the $CO_2$ content of the beer so that the beer which is produced and shipped out, day after day, can be made to have a uniform $CO_2$ content. It is also of value to be able to check the $CO_2$ content of beer in the establishments in which beer is dispensed. Such testing of the $CO_2$ content of beer is the principal function of the present invention and the hereinafter description of said invention will be based on the assumption that it is being so used. It is to be borne in mind, however, that the general organization of the invention is applicable to the measurement of the gas content in any gas-liquid solution.

The primary principle upon which the present invention is based is that beer, if in a state of equilibrium, has a $CO_2$ content which is a function of its temperature and pressure, irrespective of what its particular temperature or pressure may be, so long as the temperature is between the freezing and boiling points of the liquid, and the pressure below the liquefying pressure of the $CO_2$ and above the saturation point of the solution.

The secondary principle of the present invention is based upon a number of factors, such as the most effective agitation to obtain complete equilibrium; the unhindered permission of liquid volume change as a consequence of temperature; the maximum elimination of the detrimental effects of adhering air bubbles; etc., and consists of the empirically ascertained fact that $CO_2$ determinations are most accurate when the beer being tested has a gas space above the liquid to permit agitation to readily establish equilibrium.

These two principles are carried into effect in the present invention for testing the beer in a storage vat as follows:

1. A sample of beer is drawn from said storage vat into a closed chamber without, however, allowing the pressure in said closed chamber to drop below the saturation point of the beer, and hence without allowing the escape of any dissolved $CO_2$.

2. A definite percentage of this sample, for example 3%, is then drained off, leaving the closed testing chamber (still under pressure) containing the remaining 97% of solution, and the 3% of free $CO_2$.

3. This mixture of gas and solution is then mechanically agitated, thereby causing the mixture to be brought to a temperature-pressure equilibrium.

4. Readings of pressure and temperature are then taken.

5. An empirical chart is then employed to determine the $CO_2$ content of the beer in the storage vat.

Construction

The main body of the $CO_2$ testing apparatus employed to carry out the method of the present invention consists of an upright metal cylinder 10 having its bottom end closed by an integral cylinder floor 11. The lower end of said cylinder is preferably also provided with an outwardly extending annular flange 12 so as to render the whole apparatus stable when placed upon a table or other horizontal supporting surface. Formed integrally at the rear lower portion of said cylinder 11 is an upwardly and rearwardly sloping, tubular boss 13 into which an inlet cock 14 is screwed or otherwise rigidly and tubularly fastened. The upper end of said inlet cock 14 is provided with an enlarged, externally threaded end 15 having a flat upper face 16, the upper corner of which is cut away to form a step or arcuate locating shoulder 17 (see Figs. 2 and 5). Overlying said upper flat face 16 is a suitable perforated washer 18. Resting with its lower flat face upon said washer 18 is a nipple 20, the front lower portion of which is provided with an arcuate locating tongue 21 projecting downwardly and forwardly beyond its lower flat face and adapted to engage with its flat rear face with the flat front face of the locating shoulder 17. The washer 18 is suitably cut away at its front portion so as to properly clear said locating tongue 21. The lower end of said nipple 20 is suitably clamped against said washer 18 by a counterbored coupling nut 22 whose internal threads engage with the external threads of the enlarged end 15 of the inlet cock 14.

The upper, externally-threaded end of the nipple 20 is screwed into the lower end of a tubular clamping head 23 whose upper end is preferably axially countersunk to receive a washer 24 which is adapted to tightly bear against the nose of the test cock 25. This test cock is either screwed directly into the beer storage vat 26 (as shown) or is otherwise tubularly connected with said storage vat, depending upon the particular set-up of the permanent beer storage equipment with which the present invention is only indirectly concerned.

The means, whereby the clamping head 23 is clamped tightly against the nose of the test cock 25, is distinctly novel (see Figs. 2, 3, and 4). Formed longitudinally at opposite sides of the clamping head 23 is a pair of long guide holes 27 which are adapted to receive the downwardly and forwardly projecting tangs of a U-bolt 28, said tangs being threaded on their exterior faces only. The bight of this U-bolt is adapted to encircle the neck 30 of the test cock 25 and be prevented from slipping off of the same by a retaining lug 31 formed on said test cock. Adapted to engage with the tank threads of the U-bolt 28 is a four-wing, clamping nut 31, which is preferably constructed (as shown in Fig. 4) of two identical wing nut members joined together by flat-head screws 32. Said clamping nut 31 is suitably journaled on the hub 33 of the clamping head 23 and is prevented from downward movement relatively to said clamping head by an annular retaining flange 34, and is prevented from upward movement relatively to said clamping head by an annular thrust flange 35. Antifriction balls 36 are preferably arranged between said thrust flange 35 and the clamping nut 31 to reduce the frictional resistance when the clamping head 23 is being firmly drawn up against the nose of the test cock 25.

To connect the clamping head 23 with the test cock 25, the bight of the U-bolt 28 is slipped over the neck 30 of the test cock 25 and the clamping nut 31 then tightened until the clamping head 23 is firmly drawn up against the nose of said test cock 25.

From the foregoing it will be seen that the herein disclosed method of testing liquid beverages is adapted to be both tubularly connected with and firmly, mechanically clamped to the test cock 25. This mechanical clamping holds said apparatus firmly in place and renders it convenient to manipulate. If, for any reason, the apparatus cannot be tubularly connected with the test cock 25 in this manner, a rubber tube with suitable couplings may be connected at its one end to the nipple 20 by means of the coupling nut 22 and at its other end to the inlet cock 14, or a tubular connection between the storage tank 26 and the inlet cock 14 effected in any other desired manner.

Secured to the upper end of the cylinder 10 is a cylinder cap 37 the front upper portion of which is suitably thickened so as to enable it to be drilled and tapped to receive the lower threaded end of the coupling nipple 38. Said nipple is suitably connected by a coupling nut 40 with a Bourdon-tube type of pressure gage 41 so that the pressure within the cylinder 10 may at any time be easily ascertained. Any other type of pressure gage might be used instead of the Bourdon-tube gage shown, such as, for instance, a mercury U tube. Actual tests, however, have demonstrated that the Bourdon-tube type of gage gives superior results principally because it gives pressure readings without requiring an excessive flow of fluid into or out of it to produce the different pressure readings. The neck of said Bourdon-tube gage is provided with a bleeder valve 39 (see Figs. 1 and 6) by means of which fluid may be bled from the cylinder 10.

Arranged in the lower part of the cylinder 10 is a horizontal thermometer tube 42 which is closed at its one end with a conical cap 43, and, at its other end, extends through and is brazed or otherwise connected with the front lower wall of the cylinder 10. This tube and its cap are provided with a lining 44 constructed of steel or any other material which will not amalgamate with mercury. Positioned within said lining 44 is the lower horizontal leg of an L-shaped thermometer 45. This thermometer is gas filled so as to prevent separation of the mercury column when the apparatus is shaken. Between said lower leg and the inner wall of said lining 44 is the mercury 46 which serves to rapidly equalize the temperature between said lining 44 and the bulb 47 of the thermometer. This mercury 46 is prevented from escaping by a sealing ring 48 backed by the red litharge 50 or other self-hardening cement.

The vertical, upwardly extending leg of the thermometer 45 is disposed adjacent the front outer face of the cylinder and is protected against mechanical injury by a guard 51 of U-shaped cross section which is connected at its upper end by a screw 52 with the cylinder cap 37 and at its lower end by a screw 53 with an extension 54 of the thermometer tube 42. This guard 51 is provided on its front face with a vertical longitudinal slot 55 so as to permit the thermometer to be read by the operator. The litharge 50, aforedescribed, serves not only to hold the sealing ring 48 in place but also holds the lower end of the thermometer firmly in place but out of contact with the metallic surfaces which would be liable to crack it. The upper end of the thermometer is held in spaced relation to the metallic surfaces by a spacing ring 55I cemented or otherwise suitably held in place.

The cylinder cap 37 has a large central opening 56 which opens into the lower end of an upright tube 57 constructed of transparent material preferably of the type which is not fractured by rapid temperature changes. Arranged upon the upper end of said tube 57 is a transparent tube head 58. Suitable washers 60 and 61 are arranged at the upper and lower ends of the transparent tube 57 and a fluid-tight and mechanically-firm connection between the various parts effected by four holding-down bolts 62 connecting the transparent tube head 58 with the cylinder cap 37.

Screwed into the central part of said transparent tube head 58 is an upstanding outlet cock 63 whose upper end is tubularly connected by a gland nut 64 with the front end of a tube 65 which, in the preferred form of the invention, is constructed of metal. The rear end of said tube 65 is connected by a coupling 66 with the upper end of a rubber aspirator bulb 67. The latter is provided at its lower end with the conventional check valve 68.

*Operation*

The operator first passes the bight of the U-bolt 28 over the neck 30 of the test cock 25 of the beer storage vat 26, and then tightens the four-wing clamping nut. This mechanically holds the entire apparatus rigidly in position on said test cock 25 which is at this time, of course, closed. The operator then closes the bleeder valve 39 (if it has not already been closed as is the case in actual practice) and opens both the inlet cock 14 and outlet cock 63. He then alternately compresses and releases the aspirator bulb 67, drawing air in through its check valve 68 and forcing said air into the apparatus until the pressure gage 41 registers a pressure which is at least the saturation pressure of the beer in the storage vat 26. This is usually 6–10 lbs.

(Even if the beer pressure at the test cock 25 is as high as 40 lbs., a 12 lb. gage counter pressure in the apparatus is sufficient; with normal beer at normal temperature, to have the pressure in the apparatus above the saturation pressure of the beer. It is best, however, to have the counter pressure in the apparatus the same as that at the test cock 25, namely the bung pressure plus ½ lb. for every foot of height of beer above the test cock.)

The operator then closes the outlet cock 63 and removes the aspirator bulb 67 by unscrewing the coupling 66, and opens the test cock 25. He then gently opens the outlet cock 63 so that all the air may be expelled and the apparatus entirely filled with beer but at such a rate that the counter pressure in the apparatus is never allowed to drop so low as to allow any $CO_2$ to escape from the beer. (By loosening the gland nut 64, the tube 65 may be swung to such a position that the discharge of the beer therefrom is least inconvenient.)

The operator then closes the outlet cock 63 and opens the bleeder valve 39 and thereby discharges beer from the apparatus until its level drops approximately to the beer level mark 70. At this time the apparatus is filled 97% with beer up to said level mark 70, the remaining 3% being in the form of $CO_2$ above said level mark.

The operator then shakes the whole apparatus horizontally five to ten seconds, preferably by means of the shaking handles 71, and thereby rapidly brings the solution and the gas to a stable equilibrium, by causing the solution to be exactly saturated with gas at that particular pressure.

Through experimentation, a gas space of about 3% above the liquid gives ample free gas to accomplish this agitation in a satisfactory manner, and, consequently I have, as will be explained hereinafter, based the plotting of curves, in forming the chart which is used with the present invention, on a reduction of 3% in the volume of liquid without the admission of air. Any other percentage selected would merely entail the preparation of a suitable chart to fit that particular condition. It is to be understood that this bleeding off of 3% of the volume and the subsequent shaking of the remaining 97% of beer, merely serves to enable $CO_2$ readings to be taken expeditiously. In other words, if a long enough period of time were permitted, any sample of beer drawn off from a tank and not in a state of $CO_2$ equilibrium will attain a $CO_2$ equilibrium if allowed to stand for a sufficiently long period of time.

Readings of temperature and pressure are then taken and with this data and a suitable chart the percentage of $CO_2$ of the beer in the vat ascertained. In actual practice it has been found that a theoretical chart based upon the solution of $CO_2$ in distilled water is not satisfactory as a considerable number of other variables affect the results when the $CO_2$ content of beer is being measured. Hence the chart actually used with the present invention is of a strictly empirical character and is based upon what is considered an average American beer, and based further more upon the actual $CO_2$ found in this beer by exact laboratory analysis.

While it must be admitted that difference must exist in the properties of beer, depending upon the slightly different composition of beers, different colloidal properties, different protein composition, different viscosity, different surface tension, different resin content, different ratio of the various salts, different hydrogen ion concentration, etc., only slight differences in carbon dioxide solubility may be assumed for American average lager beers.

If the operator wishes to check whether the beer has been brought to a state of stable equilibrium, he can again shake the apparatus and again read the temperature and pressure and again determine the $CO_2$ content. If this is the same as his first determination, it is proof that the beer was in a stable equilibrium at the time the first readings were made.

When the operator has completed his $CO_2$ determination, he again attaches the aspirator bulb 67 to the apparatus and alternately compresses and expands said bulb and opens the outlet cock 63 and then gently opens the inlet cock 14 (which in this case acts as a discharge cock), so that the beer is driven from the apparatus without foaming, the operator continuing to work the bulb as the beer flows out. During this procedure the operator controls his actions by watching the pressure gage 41 so as to be able to keep the pressure above the saturation pressure of the beer.

In case the apparatus is used at high altitudes or at reduced air pressure—as frequently is produced by severe storms, there has to be subtracted from the reading obtained on the pressure gage 0.19338 lbs. per square inch for each 10 millimeters mercury pressure which the barometric reading is found to be below standard sea-level condition, (760 mm. mercury). Only for most painstaking results need the daily fluctuations of barometric pressure be considered. In case of high altitudes however, correction must be made for the great deviation in pressure from sea-level condition.

After each pressure-temperature measurement and prior to the refilling of the apparatus with another beer sample, the apparatus is discharged by slowly and continuously pumping compressed air into it at the outlet cock by means of the rubber bulb; if a sufficiently high pressure is maintained in this way on the apparatus, practically no froth adheres to the interior of the pressure vessel, and leaves the apparatus in a suitable condition for the next use. After using the apparatus it must be cleaned by filling it partly with water, shaking and discharging it.

I claim as my invention:

1. The method of determining the gas content of a liquid beverage containing gas in solution, consisting of definitely reducing the liquid volume of said solution without the admission of air, and then ascertaining the pressure and temperature of said solution and from this data empirically determining the gas content of said solution.

2. The method of determining the gas content of a liquid beverage containing gas in solution consisting of reducing the liquid volume of said solution three percent without the admission of air, and then ascertaining the pressure and temperature of said solution and from this data empirically determining the gas content of said solution.

EDWARD ZAHM.